(12) United States Patent
Hoban et al.

(10) Patent No.: US 9,639,335 B2
(45) Date of Patent: May 2, 2017

(54) CONTEXTUAL TYPING

(71) Applicant: Microsoft Corporation, Redmond, WA (US)

(72) Inventors: Lucas J. Hoban, Seattle, WA (US); Mads Torgersen, Issaquah, WA (US); Charles P. Jazdzewski, Redmond, WA (US); Anders Hejlsberg, Seattle, WA (US); Steven E. Lucco, Bellevue, WA (US); Joseph J. Pamer, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 62 days.

(21) Appl. No.: 13/798,100

(22) Filed: Mar. 13, 2013

(65) Prior Publication Data
US 2014/0282443 A1   Sep. 18, 2014

(51) Int. Cl.
*G06F 9/44* (2006.01)
*G06F 9/45* (2006.01)

(52) U.S. Cl.
CPC ............ *G06F 8/437* (2013.01); *G06F 8/20* (2013.01)

(58) Field of Classification Search
CPC ... G06F 8/20; G06F 8/24; G06F 8/437; G06F 17/2247
See application file for complete search history.

(56) References Cited

U.S. PATENT DOCUMENTS

| 5,586,328 A | 12/1996 | Caron et al. |
| 5,748,966 A * | 5/1998 | Sato ........................ G06F 8/437 717/116 |
| 6,083,282 A | 7/2000 | Caron et al. |
| 6,195,792 B1 | 2/2001 | Turnbull et al. |
| 6,381,736 B1 | 4/2002 | Klotz et al. |

(Continued)

FOREIGN PATENT DOCUMENTS

| EP | 2096534 A1 | 9/2009 |
| EP | 2141587 A1 | 1/2010 |

OTHER PUBLICATIONS

Tobias Lindahl et al.; Practical Type Inference Based on Success Typings; 2006 ACM; pp. 167-178; <http://dl.acm.org/citation.cfm?id=1140356>.*

(Continued)

*Primary Examiner* — Thuy Dao
*Assistant Examiner* — Cuong V Luu

(57) ABSTRACT

Type inference is used to provide the benefits of static type checking without explicitly declaring type in the source code. Type inference that proceeds in a bottom up direction is augmented by contextual typing that proceeds in a top down direction. Contextual typing types enclosed expressions by associating the type of a directly enclosing expression with the enclosed expression. Object literals, function literals and array literals enclosed in assignment and call expressions, can be contextually typed.

20 Claims, 7 Drawing Sheets

(56) References Cited

U.S. PATENT DOCUMENTS

| | | | |
|---|---|---|---|
| 6,941,550 B1 | 9/2005 | Sollich | |
| 7,237,226 B2 | 6/2007 | Simonyi | |
| 7,293,261 B1* | 11/2007 | Anderson | G06F 8/52 717/104 |
| 7,350,198 B2 | 3/2008 | Kluger et al. | |
| 7,523,443 B2* | 4/2009 | DeVane | G06F 8/10 717/117 |
| 7,730,448 B2 | 6/2010 | Meijer et al. | |
| 8,122,440 B1 | 2/2012 | Lentini et al. | |
| 8,332,385 B2 | 12/2012 | Moor et al. | |
| 8,473,897 B2 | 6/2013 | Box et al. | |
| 8,713,528 B1 | 4/2014 | Conrad et al. | |
| 2002/0073398 A1* | 6/2002 | Tinker | G06F 8/65 717/110 |
| 2002/0100033 A1 | 7/2002 | Halstead et al. | |
| 2003/0159057 A1 | 8/2003 | Mangold et al. | |
| 2003/0167458 A1 | 9/2003 | Santhanam et al. | |
| 2003/0208605 A1 | 11/2003 | Vu | |
| 2004/0210869 A1* | 10/2004 | DeVane | G06F 8/10 717/114 |
| 2004/0225964 A1 | 11/2004 | Simonyi | |
| 2004/0225999 A1* | 11/2004 | Nuss | G06F 8/31 717/114 |
| 2005/0097533 A1 | 5/2005 | Chakrabarti et al. | |
| 2006/0048095 A1* | 3/2006 | Meijer | G06F 8/434 717/114 |
| 2006/0089942 A1* | 4/2006 | Sutter | G06F 8/425 |
| 2006/0150146 A1 | 7/2006 | Meijer et al. | |
| 2006/0242115 A1* | 10/2006 | Baras | G06F 8/437 |
| 2006/0259541 A1 | 11/2006 | Bernabeu-Auban et al. | |
| 2007/0028223 A1 | 2/2007 | Meijer et al. | |
| 2007/0044083 A1* | 2/2007 | Meijer | G06F 8/311 717/151 |
| 2007/0078823 A1* | 4/2007 | Ravindran | G06F 17/30592 |
| 2007/0083551 A1* | 4/2007 | Jezierski et al. | 707/103 R |
| 2007/0245325 A1 | 10/2007 | Lapounov et al. | |
| 2008/0091409 A1* | 4/2008 | Anderson | G06F 8/427 704/9 |
| 2008/0178149 A1* | 7/2008 | Peterson | G06F 8/443 717/110 |
| 2008/0215520 A1 | 9/2008 | Gu et al. | |
| 2008/0243935 A1* | 10/2008 | Castro | G06F 11/1458 |
| 2008/0244511 A1* | 10/2008 | Chaoweeraprasit | G06F 17/2264 717/109 |
| 2008/0262992 A1* | 10/2008 | Meijer | G06F 9/4428 706/52 |
| 2008/0282238 A1 | 11/2008 | Meijer et al. | |
| 2009/0187882 A1 | 7/2009 | Jazdzewski | |
| 2009/0313613 A1 | 12/2009 | Ben-Artzi et al. | |
| 2009/0319554 A1 | 12/2009 | Krishnaswamy et al. | |
| 2010/0023486 A1 | 1/2010 | Baras et al. | |
| 2010/0088661 A1 | 4/2010 | Langworthy et al. | |
| 2010/0088665 A1 | 4/2010 | Langworthy et al. | |
| 2010/0088666 A1 | 4/2010 | Box et al. | |
| 2010/0088674 A1 | 4/2010 | Della-Libera et al. | |
| 2010/0169868 A1 | 7/2010 | Condit et al. | |
| 2010/0175049 A1* | 7/2010 | Ramsey | G06F 9/45512 717/115 |
| 2010/0199257 A1* | 8/2010 | Biggerstaff | G06F 8/76 717/104 |
| 2010/0211924 A1 | 8/2010 | Begel et al. | |
| 2010/0299660 A1 | 11/2010 | Torgersen et al. | |
| 2011/0167404 A1 | 7/2011 | Liu et al. | |
| 2011/0258593 A1 | 10/2011 | Ng et al. | |
| 2011/0276950 A1 | 11/2011 | Fisher et al. | |
| 2012/0005660 A1* | 1/2012 | Goetz | G06F 8/437 717/140 |
| 2012/0137367 A1 | 5/2012 | Dupont et al. | |
| 2012/0151495 A1 | 6/2012 | Burckhardt et al. | |
| 2012/0215731 A1 | 8/2012 | Junker | |
| 2014/0025714 A1* | 1/2014 | Reyntjens | G06F 17/30115 707/827 |
| 2014/0130016 A1 | 5/2014 | Menghrajani et al. | |

OTHER PUBLICATIONS

Alexander Aiken et al.; Type Inclusion Constraints and Type Inference; 1993 ACM; pp. 31-41; <http://dl.acm.org/citation.cfm?id=165188>.*

Luis Darnas et al.; Principal type-schemes for functional programs; 1982 ACM; pp. 207-212; <http://dl.acm.org/citation.cfm?id=582176>.*

John C. Mitchell et al.; Coercion and Type Inference; 1983 ACM; pp. 175-185; <http://dl.acm.org/citation.cfm?id=800529>.*

Fritz Henglein; Type Inference with Polymorphic Recursion; 1993 ACM; pp. 253-289; <http://dl.acm.org/citation.cfm?id=169692>.*

Mitchell Wand, A simple algorithm and proof for type inference; 1987 Fundamenta Informaticae; 10 pages; <http://localwww.math.unipd.it~crafa/semantica/wand87.pdf>.*

Daniel Leivant; Polymorphic type inference; 1983 ACM; pp. 88-98; <http://dl.acm.org/citation.cfm?id=567077>.*

Luis Darnas et al.; Principal type-schemes for functional programs; 1982 ACM; pp. 207-212; <http://dl.acm.org/citation.cfm?id=582176>.*

Simon Peyton Jones et al.; Simple Unification-based Type Inference for GADTs; 2006 ACM; pp. 50-61; <http://dl.acm.org/citation.cfm?id=1159811>.*

Tsung- M'in Kuo et al.; Strictness Analysis a New Perspective based on Type Inference; 1989 FFCA; pp. 260-272; <http://dl.acm.org/citation.cfm?id=99390>.*

John C. Mitchell; Polymorphic Type Inference and Containment; 1988 Elsevier; pp. 211-249; <http://www.sciencedirect.com/science/article/pii/0890540188900090>.*

Jens Palsberg et al.; Making Type Inference Practical; 1992 Springer; pp. 329-349; <http://link.springer.com/chapter/10.1007/BFb0053045>.*

Benjamin C. Pierce et al.; Local Type Inference; 2000 ACM; 44 pages; <http://dl.acm.org/citation.cfm?id=345100>.*

Heeren, et al., "Generalizing Hindley-Milner Type Inference Algorithms", Retrieved at <<http://igitur-archive.library.uu.nl/math/2007-1122-200535/heeren_02_generalizinghindleymilner.pdf>>, institute of information and computing sciences, Utrecht University, Jul. 8, 2002, pp. 1-28.

Alken, et al., "Dynamic Typing and Subtype Inference", Retrieved at <<http://www.cs.cmu.edu/~rwh/courses/refinements/papers/AikenFaehndrich95/fpca95.pdf>>, In seventh international conference on Functional programming languages and computer architecture, Jun. 26, 1995, pp. 182-191.

"TypeScript Language Specification", Retrieved at <<http://www.typescriptlang.org/Content/TypeScript%20Language%20Specification.pdf>>, Oct. 2012, pp. 1-97.

Gundry, et al., "Type inference in context", Retrieved at <<https://personal.cis.strath.ac.uk/adam.gundry/type-inference/type-inference.pdf>>, In Third ACM SIGPLAN workshop on Mathematically Structured Functional Programming, Sep. 27, 2010, pp. 43-54.

Lindahl, et al., "Practical Type Inference Based on Success Typings", Retrieved at <<http://user.it.uu.se/~tobiasl/publications/succ_types.pdf>>, In 8th ACM-SIGPLAN International Symposium on Principles and Practice of Declarative Programming, Jul. 10, 2006, pp. 167-178.

"C# Type Inference", Retrieved at <<http://www.codersource.net/MicrosoftNet/CNet30/CTypeInference.aspx>>, Retrieved Date : Nov. 5, 2012, pp. 1-4.

Sheard, et al., "Template Meta-programming for Haskell", In Proceedings of ACM SIGPLAN Notices, vol. 37, Issue 12, Oct. 3, 2002, 16 Pages.

"Technical Overview", Retrieved From <<https://web.archive.org/web/20111103042831/http://www.dartlang.org/docs/technical-overview/>>, Retrieved Date: Nov. 5, 2012, 6 Pages.

"Final Office Action Issued in U.S. Appl. No. 13/798,088", Mailed Date: Jun. 3, 2016, 19 Pages.

"Final Office Action Issued in U.S. Appl. No. 13/798,088"; Mailed Date: Mar. 19, 2015, 25 Pages.

"Non Final Office Action Issued in U.S. Appl. No. 13/798,088", Mailed Date: Aug. 20, 2015, 16 Pages.

(56) References Cited

OTHER PUBLICATIONS

"Non Final Office Action Issued in U.S. Appl. No. 13/798,088", Mailed Date: Jan. 22, 2016, 17 Pages.
"Non Final Office Action Issued in U.S. Appl. No. 13/798,088", Mailed Date: Nov. 13, 2014, 17 Pages.
"Non Final Office Action Issued in U.S. Appl. No. 13/798,088", Mailed Date: Oct. 4, 2015, 19 Pages.
"Final Office Action Issued in U.S. Appl. No. 13/798,095", Mailed date: Dec. 17, 2015, 19 Pages.
"Final Office Action Issued in U.S. Appl. No. 13/798,095", Mailed Date: Mar. 5, 2015, 27 Pages.
"Non Final Office Action Issued in U.S. Appl. No. 13/798,095", Mailed Date: Aug. 28, 2015, 16 Pages.
"Non Final Office Action Issued in U.S. Appl. No. 13/798,095", Mailed date: May 25, 2016, 10 Pages.
"Non Final Office Action Issued in U.S. Appl. No. 13/798,095", Mailed Date: Oct. 21, 2014, 22 Pages.
"Notice of Allowance Issued in U.S. Appl. No. 13/798,095", Mailed Date: Sep. 13, 2016, 7 Pages.
"Final Office Action Issued in U.S. Appl. No. 13/798,107", Mailed Date: Mar. 6, 2015, 32 Pages.
"Final Office Action Issued in U.S. Appl. No. 13/798,107", Mailed Date: Nov. 27, 2015, 26 Pages.
"Non Final Office Action Issued in U.S. Appl. No. 13/798,107", Mailed Date: Jun. 6, 2016, 22 Pages.
"Non Final Office Action Issued in U.S. Appl. No. 13/793,107", Mailed Date: Oct. 29, 2014, 30 Pages.
"Non Final Office Action Issued in U.S. Appl. No. 13/798,107", Mailed Date: Jul. 16, 2015, 23 Pages.
"Notice of Allowance Issued in U.S. Appl. No. 13/798,107", Mailed Date: Oct. 12, 2016, 9 Pages.
Amadio, et al., "Subtyping Recursive Types", In Proceedings of the 18th ACM Sigplan-Silgact Symposium on Principles of Programming Languages, Jan. 3, 1991, pp. 104-118.
Chapman, et al., "On the Principled Design of Object Oriented Programming Languages for High Integrity Systems", In Proceedings of the 2nd NASA/FAA Object Oriented Technology in Aviation Workshop, Mar. 27, 2003, 12 Pages.
Bayne, et al., "Always-Available Static and Dynamic Feedback", In Proceedings of the 33rd International Conference on Software Engineering, May 21, 2011, 10 Pages.
Bessey, et al., "A few Billion Lines of Code Later Using Static Analysis to Find Bugs in the Real World", In Communications of the ACM, vol. 53, Issue 2, Feb. 1, 2010, pp. 66-75.
Buneman, et al., "A Query Language and Optimization Techniques for Unstructured Data", In Proceedings of the ACM SIGMOD International Conference on Management of Data, Jun. 1, 1996, pp. 505-516.
Buneman, et al., "Programming Constructs for Unstructured Data", In Institute for Research in Cognitive Science (IRCS) Technical Reports Series, Mar. 1, 1995, 12 Pages.
Engler, et al., "Checking System Rules Using System-Specific, Programrner-Written Compiler Extensions", In Proceedings of the 4th conference on Symposium on Operating System Design & Implementation, vol. 4, Article 1, Oct. 22, 2000, 16 pages.
Esposito, Dino, "C# 4.0, the Dynamic Keyword and COM", Retrieved From <<https://msdn.microsoft.com/en-us/magazine/ff714563.aspx>>, Jun. 2010, 6 Pages.

Flanagan, et al., "Extended Static Checking for Java", In Proceedings of tne ACM SIGPLAN Conference on Programming Language Design and Implementation, Jun. 17, 2002, pp. 234-245.
Haldiman, et al., "Practical, Pluggable Types for a Dynamic Language", In Proceedings of Computer Languages, Systems & Structures, vol. 35, Issue 1, Apr. 2009, 31 Pages.
Hallem, et al., "A System and Language for Building System-Specific, Static Analyses", In Proceedings of the ACM SIGPLAN Conference on Programming language design and implementation, Jun. 17, 2002, pp. 69-82.
Hendren, et al., "Parallelizing Programs with Recursive Data Structures", In Journal of IEEE Transactions on Parallel and Distributed Systems, vol. 1 Issue 1, Jan. 1, 1990, pp. 35-47.
Klarlund, et al., "Graph Types", In Proceedings of the 20th ACM SIGPLAN-SIGACT Symposium on Principles of Programming Languages, Mar. 1, 1993, pp. 196-205.
Necula, et al., "CCured: Type-Safe Retrofitting of Legacy Code", In Proceedings of the 29th ACM SIGPLAN-SIGACT symposium on Principles of programming languages, Jan. 16, 2002, pp. 128-139.
Paige, et al., "Specification-Driven Development of an Executable Metamodet in Eiffel", In Proceedings of Essentials of the 3rd UML Workshop in Software Model Engineering, Oct. 11, 2004, 8 Pages.
Reiss, Steven P., "PECAN: Program Development Systems that Support Multiple Views", In Proceedings of IEEE Transactions on Software Engineering, vol. 11, Issue 3, Mar. 1985, pp. 276-285.
Saraswat, et al., "Constrained Types for Object-Oriented Languages", In Proceedings of the 23rd ACM SIGPLAN conference on Object-oriented programming systems languages and applications, Oct. 19, 2008, 28 Pages.
Viega, et al., "ITS4: A Static Vulnerability Scanner for C and C++ Code", In Proceedings of the 16th Annual Computer Security Applications Conference, Dec. 11, 2000, 11 Pages.
Wyk, et al., "Adding Suntax and Static Analysis to Libraries via Extensible Compilers and Language Extensions", In Proceedings of Library-Centric Software Design (LCSD), Oct. 2006, 10 Pages.
Zakas, Nicholas C., "Thoughts on TypeScript", Retrieved From <<https://www.nczonline.net/blog/2012/10/04/thoughts-on-typescript/>>, Oct. 4, 2012, 11 Pages.
"Notice of Allowance Issued in U.S. Appl. No. 13/798,095", Mailed Date: Dec. 16, 2016, 10 Pages.
Boyapati, et al., "Ownership Types for Safe Programming Preventing Data Races and Deadlocks", In Proceedings of the 17th ACM SIGPLAN conference on Object-oriented programming, systems, languages, and applications, Nov. 4. 2002, pp. 211-230.
Chambers, et al., "Customization: Optimizing Compiler Technology for Self a Dynamically-Typed Object-Oriented Programming Language", In Proceedings of the ACM SIGPLAN 1989 conference on Programming language design and implementation, Jun. 21, 1989, pp. 146-160.
Furr, et al., "Static Type Inference for Ruby", In Proceedings of the 2009 ACM symposium on Applied Computing, Mar. 8, 2009, pp. 1859-1866.
Huang, et al., "Securing Web Application Code by Static Analysis and Runtime Protection", In Proceedings of the 13th International Conference on World Wide Web, May 17, 2004, pp. 40-51.
Myers, C. Andrew., "JFlow: Practical Mostly-Static Information Flow Control", In Proceedings of the 26th ACM SIGPLAN-SIGACT symposium on Principles of programming languages, Jan. 1, 1999, pp. 228-241.

* cited by examiner

CONTEXTUAL TYPING

CROSS-REFERENCE TO RELATED APPLICATIONS

The application is related in subject matter to co-pending U.S. patent application Ser. No. 13/798,088 entitled "STATIC TYPE CHECKING ACROSS MODULE UNIVERSES", filed on Mar. 13, 2013. The application is related in subject matter to co-pending U.S. patent application Ser. No. 13/798,095 entitled "STATICALLY EXTENSIBLE TYPES", filed on Mar. 13, 2013. The application is related in subject matter to co-pending U.S. patent application Ser. No. 13/798,107 entitled "GRAPH-BASED MODEL FOR TYPE SYSTEMS", filed on Mar. 13, 2013.

BACKGROUND

A programming language in which the type of a value is validated at run-time is a dynamically typed language. A programming language in which the type of an expression is validated at compile time is a statically typed language. In statically typed languages, the input and output types of expressions typically are explicitly provided by type annotations.

Type inference refers to the ability to deduce the type of an expression at compile time. Type inference is a feature of statically typed languages including but not limited to Visual Basic, C++, ML, OCaml, Haskell, Scala, D, Clean, Opa and Go. Functional programming languages typically include the ability to infer type. Type inference makes certain programming tasks easier because type checking is still performed by the compiler even if type annotations have been omitted from the source code.

One use of type inference in programming languages is to provide the benefits of static type checking without the need for coding that repeatedly declares type information.

SUMMARY

Contextual typing as described herein can augment bottom up type inference in a programming language. Contextual typing can assign data type information associated with the context of an enclosing (outer) expression to (inner) constructs enclosed by the enclosing expression. That is, a set of lexically enclosing expressions in a programming language can push type information associated with the enclosing expressions into the enclosed expressions. Type information can be pushed into enclosed expressions comprising but not limited to object literals, function literals and array literals inside enclosing expressions comprising but not limited to assignment and call expressions. In typed function calls, argument expressions can be contextually typed by their parameter types. In assignment expressions, the right hand expression can be contextually typed by the type of the left hand expression. Type information can be pushed through any number of levels of nesting of enclosed expressions including but not limited to object literals, function literals and array literals. Both parameter and return type information can be pushed into enclosed expressions such as but not limited to function literals.

The performance of the type checking algorithm for contextual typing is linear. Contextual typing can be optional, meaning a developer can decide to explicitly declare a type for an expression. Explicitly declaring a type for an expression overrides contextual typing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
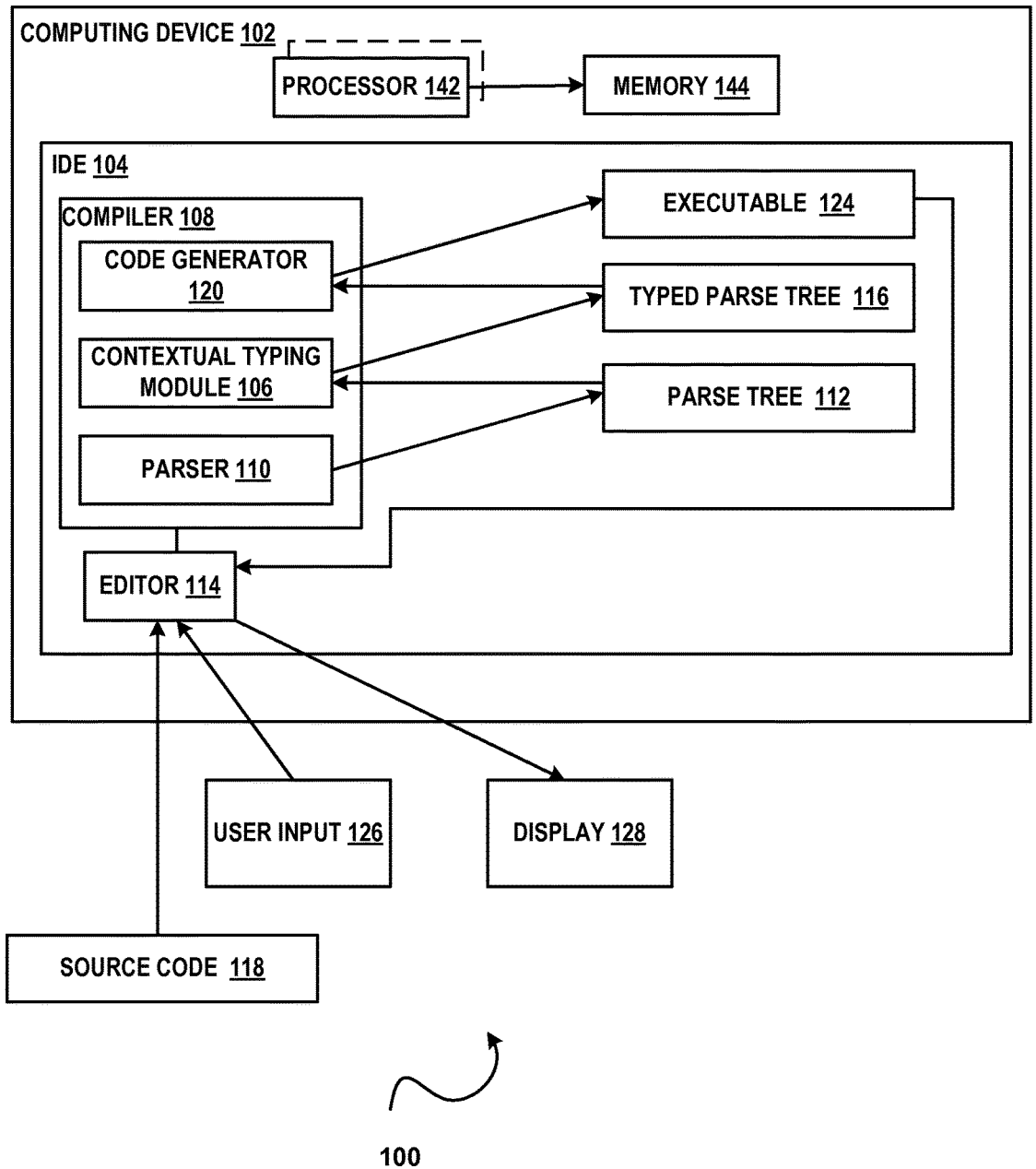
FIG. 1a illustrates an example of a system 100 that performs contextual typing in accordance with aspects of the subject matter described herein.

Traditionally, type inference is implemented using one of two approaches: bottom up type inference or global constraint-based type inference. Bottom up collection of type information collects type information from the leaves of a parse tree that represents a program, where a leaf node of the parse tree represents a constant, a language primitive or an annotated value and applies the rules of the language to type each language construct in the parse tree in a bottom up direction using the type associated with the construct represented by the leaf node. In contrast, a global constraint-based approach aggregates typing requirements in the program and then analyzes the requirements to provide a type associated with an expression.

Type inference ordinarily proceeds in a bottom up direction from the leaves of an expression tree representing a segment of code to the root of the expression tree. For example, in the program code:

```
function mul(a: number, b: number) {
    return a * b;
}
``` a function "mul" takes two parameters "a" and "b" and returns the product of "a" and "b" ("a*b"). Because "a" and "b" are defined as type "number" ("a: number, b: number") "number" is inferred as the return type of the function "mul" by propagating type information in a bottom up direction in the parse tree representing the code fragment and assigning the propagated type information to the return expression.

In accordance with aspects of the subject matter described herein, in some contexts, inference can proceed in a top down direction where type information for an enclosed expression is inferred from the type of the expression enclosing the expression whose type is inferred. Typing that proceeds in a top down direction is referred to herein as contextual typing. Contextual typing can refer to the application of top-down inference locally for some elements of the programming language. Contextual typing thus can increase the number of cases in which type inference can be applied. Contextual typing can help development tools provide information to developers when, for example, a developer is using a type but may not know all of the details of the type.

One programming language in which contextual typing is featured is TypeScript. TypeScript was designed to meet the needs of JavaScript programming teams that build and maintain large JavaScript programs such as web applications. TypeScript can help programming teams define interfaces between software components. TypeScript can help programming teams gain insight into the behavior of existing JavaScript libraries. TypeScript's optional type system enables the use of development tools and practices including static checking, symbol-based navigation, statement completion, code re-factoring and so on. TypeScript is a superset of JavaScript, meaning that any valid JavaScript code is valid TypeScript code. TypeScript adds additional features on top of JavaScript. TypeScript can be converted into ECMAScript 5 compatible code by the TypeScript compiler, a different approach than that taken by other known compile-to-JavaScript languages. TypeScript permits the annotation of variables, function arguments, and functions with type information, facilitating the use of tools such as auto-completion tools and enabling more comprehensive error checking than that provided by using traditional JavaScript.

Contextual typing can enable fewer type annotations to be needed in programs, while still providing type information during program development. Contextual typing can enable tools to provide type information for an enclosed expression whose type is inferred from the type of an expression that encloses the enclosed expression.

For example, in the following code:

```
declare function twice(f: (x: number) => number, initial: number): number
twice(function(x) {
    return x * 2;
}, 3)
``` a function named "twice" is declared to exist. The function "twice" has a prescribed type signature expecting two parameters, the first of which is a function that takes one parameter of type "number" and returns a number value. When the "twice" function is called, the "twice" function can pass a function literal "function(x) { ... }" as its first argument. The function literal "function(x) { ... }" does not specify the type of the parameter "x". By contextual typing, however, it can be established that "x" has type "number" because the function literal "function(x) { ... }" appears as a parameter to the call to "twice", which has a known parameter type of "number". In this way, top-down type information is passed from the call to the function "twice" into the function literal parameter to that call.

Contextual Typing

FIG. 1a illustrates a block diagram of an example of a system 100 in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 may execute in whole or in part on a software development computer such as the software development computer described with respect to FIG. 4. All or portions of system 100 may be operated upon by program development tools. For example, all or portions of system 100 may execute within an integrated development environment (IDE) such as for example IDE 104. IDE 104 may be an IDE as described more fully with respect to FIG. 4 or can be another IDE. System 100 can execute wholly or partially outside an IDE.

System 100 can include one or more computing devices such as, for example, computing device 102. A computing device such as computing device 102 can include one or more processors such as processor 142, etc., and a memory such as memory 144 connected to the one or more processors. Computing device 102 can include one or more modules comprising a compiler such as compiler 108. A compiler such as compiler 108 may be a computer program or set of programs that translates text written in a (typically high-level) programming language into another (typically lower-level) computer language (the target language). The output of the compiler may be object code. Typically the output is in a form suitable for processing by other programs (e.g., a linker), but the output may be a human-readable text file. Source code is typically compiled to create an executable program but may be processed by program development tools which may include tools such as editors, beautifiers, static analysis tools, refactoring tools and others that operate in background or foreground.

A compiler 108 may comprise a .NET compiler that compiles source code written in a .NET language to intermediate byte code. .NET languages include but are not limited to C#, C++, F#, J#, JScript.NET, Managed Jscript, IronPython, IronRuby, VBx, VB.NET, Windows PowerShell, A#, Boo, Cobra, Chrome (Object Pascal for .NET, not the Google browser), Component Pascal, IKVM.NET, IronLisp, L#, Lexico, Mondrian, Nemerle, P#, Phalanger, Phrogram, PowerBuilder, #Smalltalk, AVR.NET, Active Oberon, APLNext, Common Larceny, Delphi.NET, Delta Forth .NET, DotLisp, EiffelEnvision, Fortran .NET, Gardens Point Modula-2/CLR, Haskell for .NET, Haskell.net, Hugs for .NET, IronScheme, LOLCode.NET, Mercury on .NET, Net Express, NetCOBOL, OxygenScheme, S#, sml.net, Wildcat Cobol, X# or any other .NET language. Compiler 108 may comprise a JAVA compiler that compiles source code written in JAVA to byte code. Compiler 108 can be any compiler for any programming language including but not limited to Ada, ALGOL, SMALL Machine Algol Like Language, Ateji PX, BASIC, BCPL, C, C++, CLIPPER 5.3, C#, CLEO, CLush, COBOL, Cobra, Common Lisp, Corn, Curl, D, DASL, Delphi, DIBOL, Dylan, dylan.NET, eC (Ecere C), Eiffel, Sather, Ubercode, eLisp Emacs Lisp, Erlang, Factor, Fancy, Formula One, Forth, Fortran, Go, Groovy, Haskell, Harbour, Java, JOVIAL, LabVIEW, Nemerle, Obix, Objective-C, Pascal, Plus, ppC++, RPG, Scheme, Smalltalk, ML, Standard ML, Alice, OCaml, Turing, Urq, Vala, Visual Basic, Visual FoxPro, Visual Prolog, WinDev, X++, XL, and/or Z++. Compiler 108 can be a compiler for any typed programming language.

A compiler such as compiler 108 and/or program development tools are likely to perform at least some of the following operations: preprocessing, lexical analysis, parsing (syntax analysis), semantic analysis, code generation, and code optimization. Compiler 108 may include one or more modules comprising a parser such as parser 110 that receives program source code and generates a parse tree such as parse tree 112. Parser 110 can be a background parser, parallel parser or incremental parser. Parser 110 can be a pre-processor, or a plug-in or add-in or an extension to an IDE, parser, compiler or pre-processor. Parser 110 can include a syntax analyzer that may perform syntax analysis. Syntax analysis involves parsing a token sequence to identify the syntactic structure of the program. The syntax analysis phase typically builds a parse tree such as parse tree 112. A parse tree replaces the linear sequence of tokens in the program source code with a tree structure built according to the rules of a formal grammar which define the syntax of the programming language. The parse tree is often analyzed, augmented, and transformed by later phases in the compiler. Compiler 108 may also include a code generator such as code generator 120 that receives a parse tree such as typed parse tree 116 or parse tree 112 and generates an executable such as executable 124. Compiler 108 may also include other components known in the art.

System 100 can include one or more modules such as contextual typing module 106 that performs contextual typing as described herein. Contextual typing module 106 can be a part of compiler 108, as illustrated in FIG. 1a or can be a separate entity, plug-in, or add-on (not shown). Contextual typing module 106 can receive a parse tree such as parse tree 112 and produce a contextually typed parse tree such as contextually typed parse tree 116. It will be appreciated that one or more modules such as for example, contextual typing module 106 can be loaded into memory 144 to cause one or more processors such as processor 142, etc. to perform the actions attributed to contextual typing module 106. System 100 can include any combination of one or more of the following: an editor such as but not limited to editor 114, a display device such as display device 128, and so on. Editor 114 can receive source code such as source code 118 and user input such as user input 126. Results such as but not limited to displaying the type of an expression for which the type was determined by contextual typing can be displayed on display device 128. Other components well known in the arts may also be included but are not here shown.

In accordance with some aspects of the subject matter described herein, compiler 108 can receive source code such as but not limited to TypeScript source code and can generate an executable such as but not limited to JavaScript executable output. Suppose for example, a fragment of source code 118 is:

```
var f : T = {
    foo: function(s) {
        var n = s.length;
        return { n: n };
    }
}
```

Figure 1B:
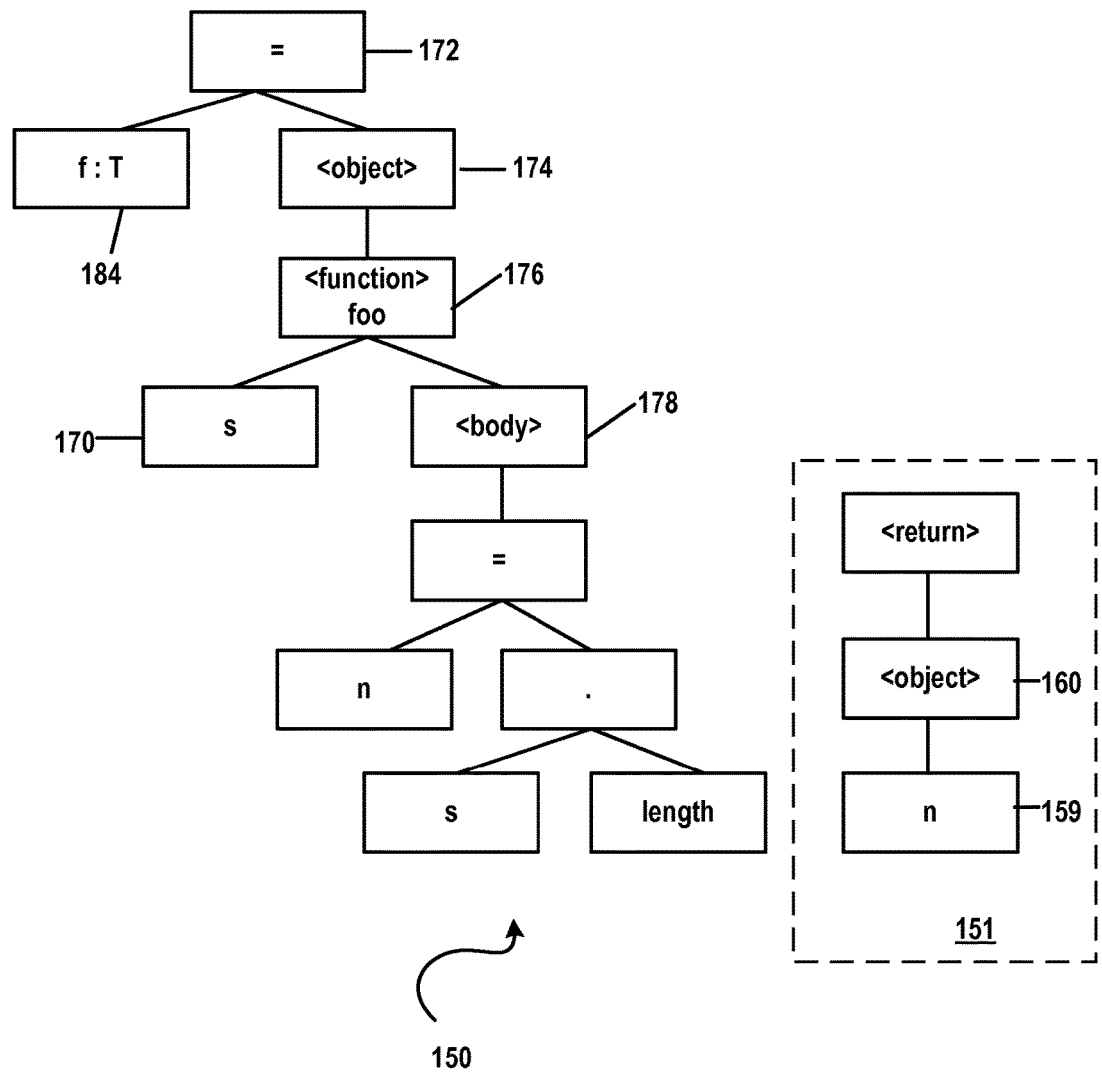
FIG. 1b illustrates examples of parse trees representing fragments of program source code.

The code "var f: T=" declares a variable "f" of type "T". The code "foo: function(s) {" initializes variable "f" to an object which has a single member "foo". Member "foo" is a function that takes a parameter "s". The code "return {n:n};" says that function "foo" returns an object, and that object includes a single property "n". The code "var n=s.length;" says that the value of "n" is the length of "s". A parse tree can be generated from this source code fragment. FIG. 1b, parse tree 150, illustrates a parse tree created from the source code fragment above. FIG. 1b, parse tree 151, illustrates another parse tree created from the source code fragment above.

The code:

```
interface T {
    foo(s: string): {n: number; }
}
``` declares an interface "T". Interface "T" is defined to describe any object that has a method "foo". This method "foo" is a function that takes an argument "s" of type "string" and returns an object with a member "n" of type "number".

In FIG. 1b, parse tree 150 representing the code:

```
var f : T = {
    foo: function(s) {
        var n = s.length;
``` includes node 172 representing the assignment operator "=" in the line
   var f: T={
Node 184 represents the declaration of variable f as type "T" ("f: T"). Node 174 represents the initialization of variable "f" to an object. Node 176 indicates that the object represented by node 174 has a member "foo" that is a function. Node 170 represents that function "foo" takes a parameter "s". Node 178 represents the subtree representing a portion of the body of the function "foo":

```
    var n = s.length;
    In FIG. 1b, parse tree 151 represents the code:
    return { n: n };
```

Node 160 represents the object returned by function "foo". Node 159 represents property "n", a property of function "foo".

A programming language's type system as described herein (such as but not limited to a TypeScript type system) can enable a developer to specify limits on the capabilities of programming objects such as but not limited to JavaScript objects, and to use tools that enforce the specified limits. To minimize the number of annotations needed (e.g., to enable tools to become useful), the type system can make use of type inference. For example, from the following statement, a programming language can infer that the variable "i" has the type "number".
   var i=0;
TypeScript, for example, will infer from the following function definition that the function f has return type "string" because "hello" is a string.

```
function f( ) {
    return "hello";
}
```

Figure 1C:
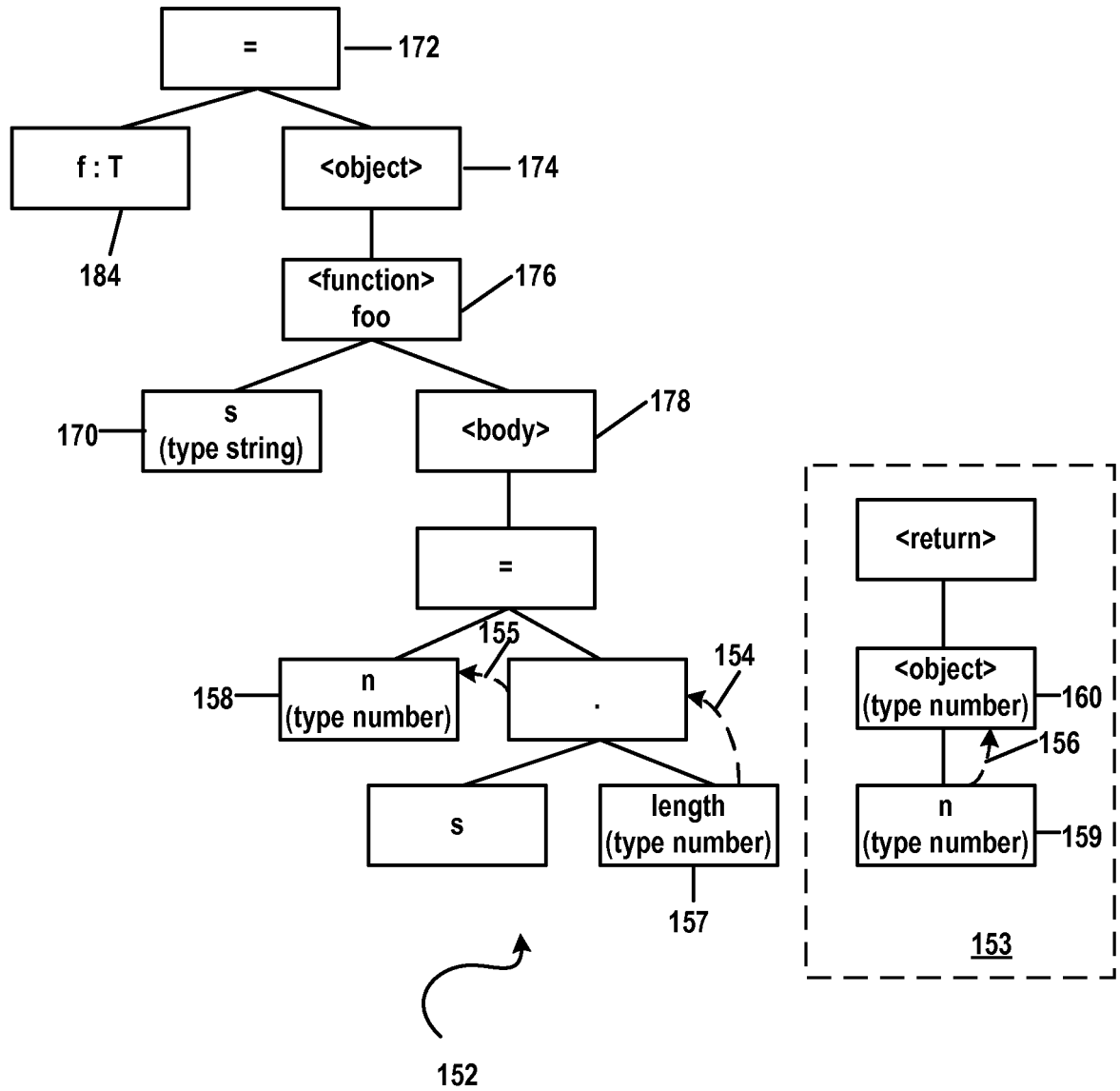
FIG. 1c illustrates the example of the parse trees of FIG. 1b in which inference typing has occurred in accordance with aspects of the subject matter disclosed herein.

From the parse trees illustrated in FIG. 1b, bottom up type inference can be used to assign the type of a leaf node "length" (e.g., of type "number"), to internal nodes, as illustrated in FIG. 1c, parse tree 152 and parse tree 153. In parse tree 152, the leaf node representing "length", node 157, has type "number". The type of internal node 158 is inferred to be of type "number" by propagating the type of the leaf node representing "length" (node 157) in a bottom up direction via hashed arrow 154 and hashed arrow 155 to the node representing "n", node 158, assigning the type of "n" to "number". Similarly, in parse tree 153, the type of leaf node 159 representing "n" (type "number") is propagated in a bottom up direction to internal node 160 representing "<object>", indicated by hashed arrow 156, thereby inferring that the object represented by node 160 is of type "number".

Figure 1D:
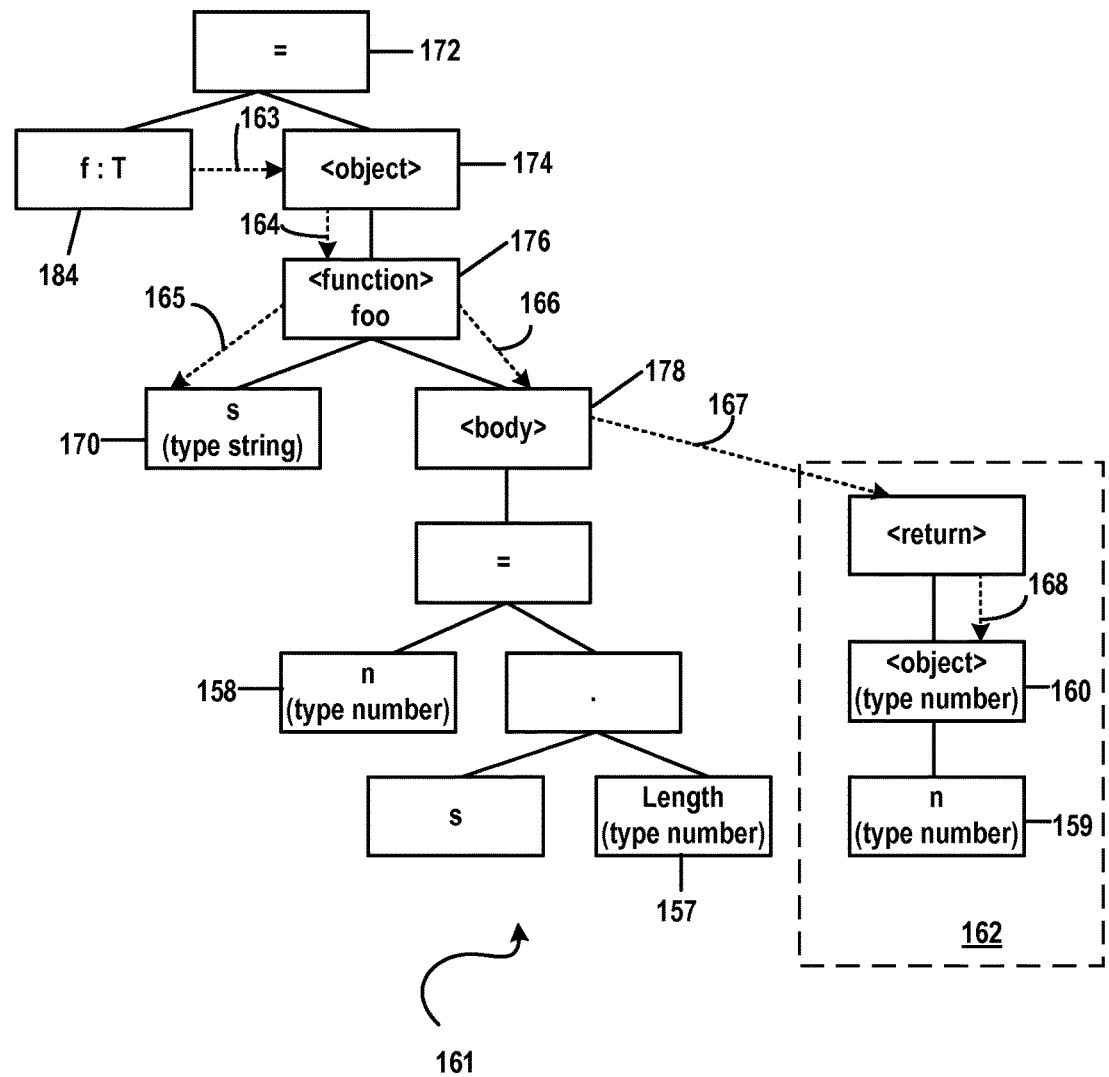
FIG. 1d illustrates the examples of parse trees of FIG. 1b and FIG. 1c in which contextual typing has occurred in accordance with aspects of the subject matter disclosed herein.

In the parse trees illustrated in FIG. 1d, contextual (top down inference) typing in an "assignment" context is illustrated in parse tree 161 and parse tree 162. In FIG. 1d, type inference proceeds in a locally top down direction, leveraging type information established by the bottom up type inference described in FIG. 1c. Type information is pushed into object literals (into node 174 from node 184 via arrow 163 and into node 160 via arrows 166, 167 and 168). Type information is pushed into function literals via arrows 165, 166 and 167. The assignment ("=") node, node 172, starts the contextual typing as indicated by arrow 163.

Based on the interface "T" described above, contextual typing establishes that a property named "foo" in the object literal represented by node 174 is a function type (represented by node 176) as indicated by arrow 164. The function represented by node 176 has a first parameter "s" of type "string" (represented by node 170), as indicated by arrow 165. The function represented by node 176 returns a type "number", which means that the "return" statement represented by parse tree 162 returns an object represented by node 160 with a member "n" of type "number" represented by node 159, as indicated by arrow 168. The bottom up type inference of FIG. 1c established that "n" had type number.

A language that supports contextual typing can enable a developer to benefit from type inference even though explicit type annotations are not provided in the source code. In accordance with aspects of the subject matter described herein, explicit type annotations can still be provided in the source code. (This may be desired because, for example, some tools may need the developer to provide explicit type annotations.) In TypeScript, for example, a type annotation can be provided, as in the following code fragment.

```
function f(s: string) {
    return s;
}
f({ });   // Error
f("hello"); // Ok
```

The code "function f(s: string) {" defines a function "f" that receives a parameter "s" having an explicit annotation declaring "s" to be of type "string". Function "f" returns "s" of type "string" ("return s;"). "f({ });" calls function "f" with an object. "f("hello");" calls function "f" with the string "hello".

The optional type annotation on the parameter "s" ("(s; string)") lets the type checker know that the developer expects parameter "s" to be of type "string". Within the body of function "f", tools can assume "s" is of type "string" and can provide operator type checking and member completion information consistent with this assumption. Tools can also signal an error on the first call to "f", ("f({ });) because "f" expects a string, not an object, as its parameter. Calling function "f" with the "hello" does not generate an error because "hello" is a string. For the function "f", in accordance with aspects of the subject matter described herein, a compiler such as the TypeScript compiler can emit code such as the following JavaScript code:

```
function f(s) {
    return s;
}
``` in which type annotations have been removed. In general, the TypeScript compiler removes all type information before emitting JavaScript.

Parameter and return types of function expressions can be automatically inferred from the contexts in which the function expressions occur. For example, given the declaration:
   var f: (s: string)=>string;
which explicitly declares the parameter "s" to be of type "string", the assignment:
   f=function(s) {return s.toLowerCase( )}
indicates that a function "f" takes a string argument and returns a version of that string converted to lower case. In accordance with aspects of the subject matter described herein, the type of the "s" parameter is inferred to be of "string" type even though there is no type annotation to that effect in the assignment statement through contextual typing. The function expression is said to be contextually typed by the variable to which it is being assigned.

In variable and member declarations with a type annotation and an initializer, the initializer expression can be contextually typed by the type of the variable or property. In assignment expressions, the right hand expression can be contextually typed by the type of the left hand expression. In typed function calls, argument expressions can be contextually typed by their parameter types. In return statements, if the enclosing function has a known return type, the expression can be contextually typed by that return type. A function's return type is known if the function includes a return type annotation or if the function itself is contextually typed. In contextually typed object literals, property assignments can be contextually typed by their property types. In contextually typed array literals, element expressions can be contextually typed by the array element type.

Contextual typing of an expression "e" by a type "T" can proceed as follows. If "e" is an object literal and "T" is an "object" type, "e" can be processed with the contextual type "T". If "e" is an array literal and "T" is an "array" type, "e" can be processed with the contextual type "T". In a language such as but not limited to TypeScript in which a function expression may include parameter annotations and/or return type annotations, if "e" is a function expression with no parameter or return type annotations and "T" is an "object" type with exactly one call signature, "e" can be processed with the contextual type "T". Otherwise, "e" can be processed without a contextual type. For example, in the following code, an array literal expression "[ . . . , . . . ]" is assigned to a variable "arr". The type of this variable is an array type whose elements are functions that take a string and return a number. In this case, contextual typing processes the array literal with the provided type. In turn, each function literal expression with no parameter or return type annotation "function( . . . ) { . . . }" is processed according to the array element type '(x: string)=>number'.
   var arr:  {(x: string): number}[ ]=[function(x) {return x.length;}, function(y) {return y.charCodeAt(0);}]

If "e" is an object literal and "T" is an "object" type, "e" is processed with the contextual type "T". The type of an object literal can be an "object" type with the set of properties specified in the object literal. For each property assignment that assigns an expression to a name property (e.g., in the case of TypeScript, Name: Expr) in the object literal, the type of the resulting property can be determined as follows. If the object literal is contextually typed and the contextual type includes a property "p" with the given Name, then the expression can be contextually typed by the type of "p". The type of the expression can be made assignable to the type of "p". The resulting property can be inferred to be of type "p". Otherwise, the type of the resulting property is the type of Expr.

Figure 2:
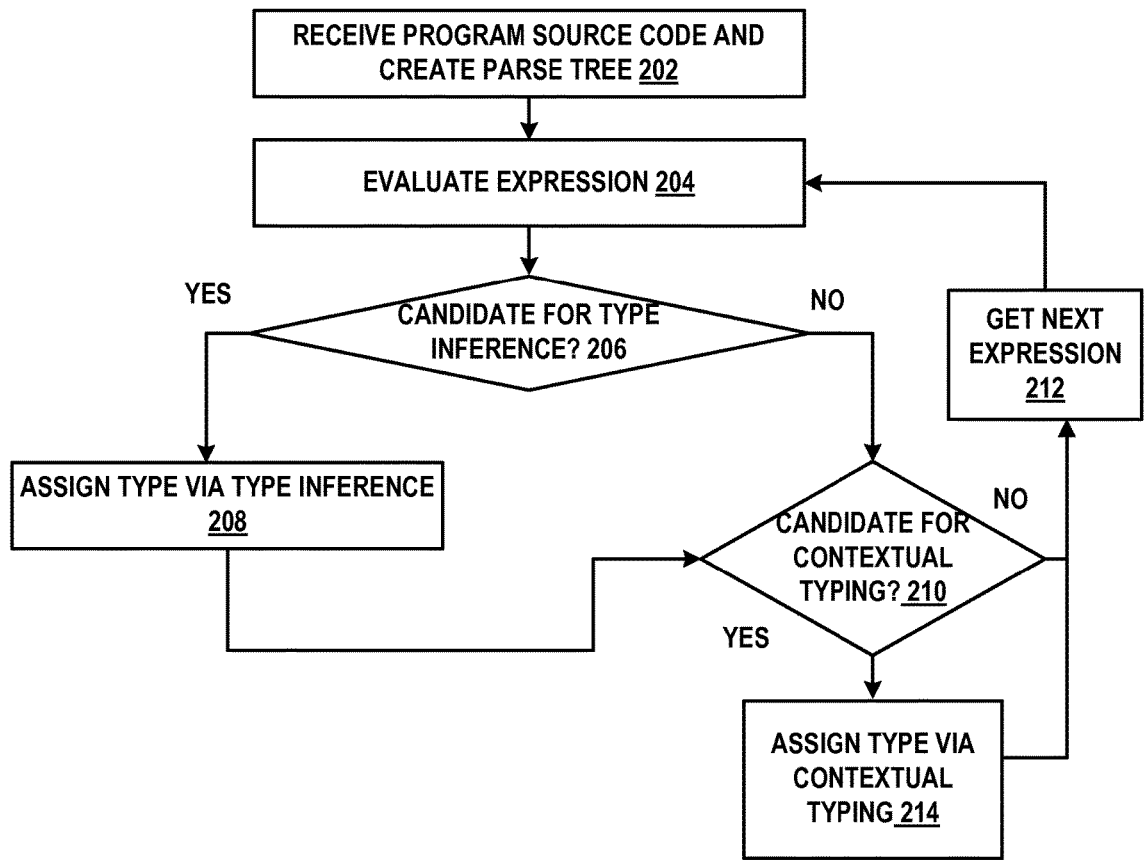
FIG. 2 illustrates an example of a method 200 that performs contextual typing in accordance with aspects of the subject matter disclosed herein.

FIG. 2 illustrates an example of a method 200 that types expressions in accordance with aspects of the subject matter disclosed herein. The method described in FIG. 2 can be practiced by a system such as but not limited to the one described with respect to FIG. 1a and for which an example was provided in FIGS. 1b through 1d. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

At operation 202 program source code can be received and a parse tree can be created therefrom. Each expression in the parse tree can be represented by a subtree of the parse tree. At operation 204 an expression can be evaluated. The purpose of evaluating the expression is to determine the type that can be assigned to the expression. At operation 206 the expression can be examined to determine if the expression is a candidate for bottom up type inference. In response to determining that the expression is a candidate for bottom up type inference, at operation 208 the expression is assigned a type via bottom up type inference. Processing can continue at operation 210. In response to determining at operation 206 that the expression is not a candidate for bottom up type inference, the expression is examined to determine if the expression is a candidate for contextual typing 210.

In response to determining that the expression is not a candidate for contextual typing the next expression in the parse tree is retrieved at 212 and processing proceeds at operation 204. At operation 210 in response to determining that the expression is a candidate for contextual typing, a type is assigned to the expression via contextual typing at operation 214. At operation 210 the expression is determined to be a candidate for contextual typing by comparing the expression with a set of contextual typing templates representing cases in which type can be assigned via contextual typing. The set of contextual typing templates can include a template for object literals, function literals and array literals inside assignment and call expressions, a template for typed function calls in which argument expressions can be contextually typed by their parameter types, a template for assignment expressions, in which the right hand expression can be contextually typed by the type of the left hand expression.

At operation 214 the template that matches the expression is determined and contextual typing is performed in accordance with a typing process associated with the matching template, as described more fully above. Contextual typing can be recursive. That is, an enclosing expression may comprise an enclosed expression that itself encloses another expression, and so on to any level of nesting. Contextual typing can be repeatedly applied to type the enclosing expression, the enclosed expression that itself encloses another enclosed expression and so on until the final enclosed expression is typed. The method 200 described above can be repeated until the entire parse tree has been processed so that all expressions within the parse tree are typed. It will be appreciated that although described within the context of a particular programming language (i.e. TypeScript), the subject matter described herein is applicable to any typed language. Moreover, although types of expressions for which contextual typing is applicable have been described, other types of expressions for which contextual typing is applicable are contemplated.

Example of a Suitable Computing Environment

Figure 3:
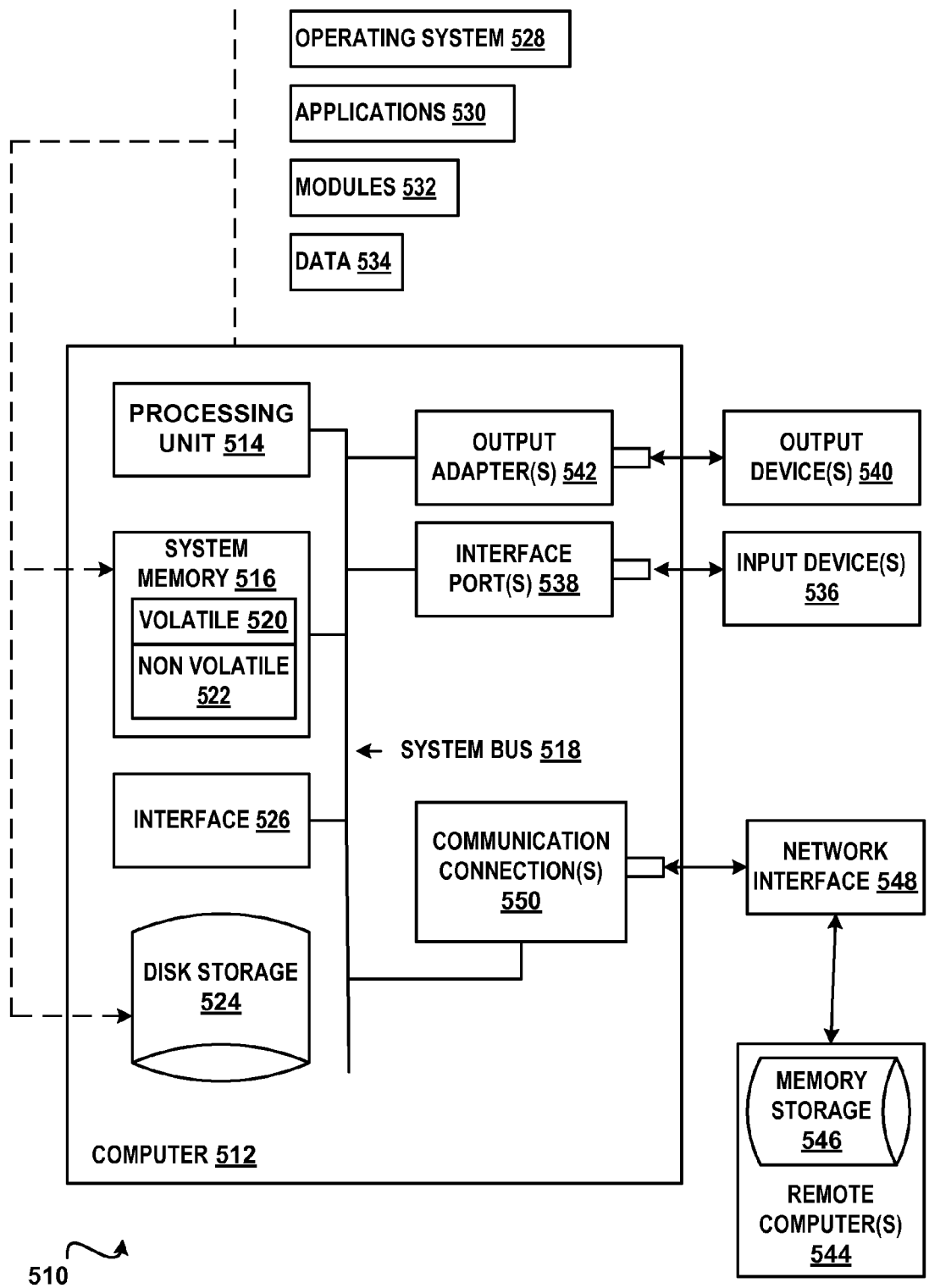
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
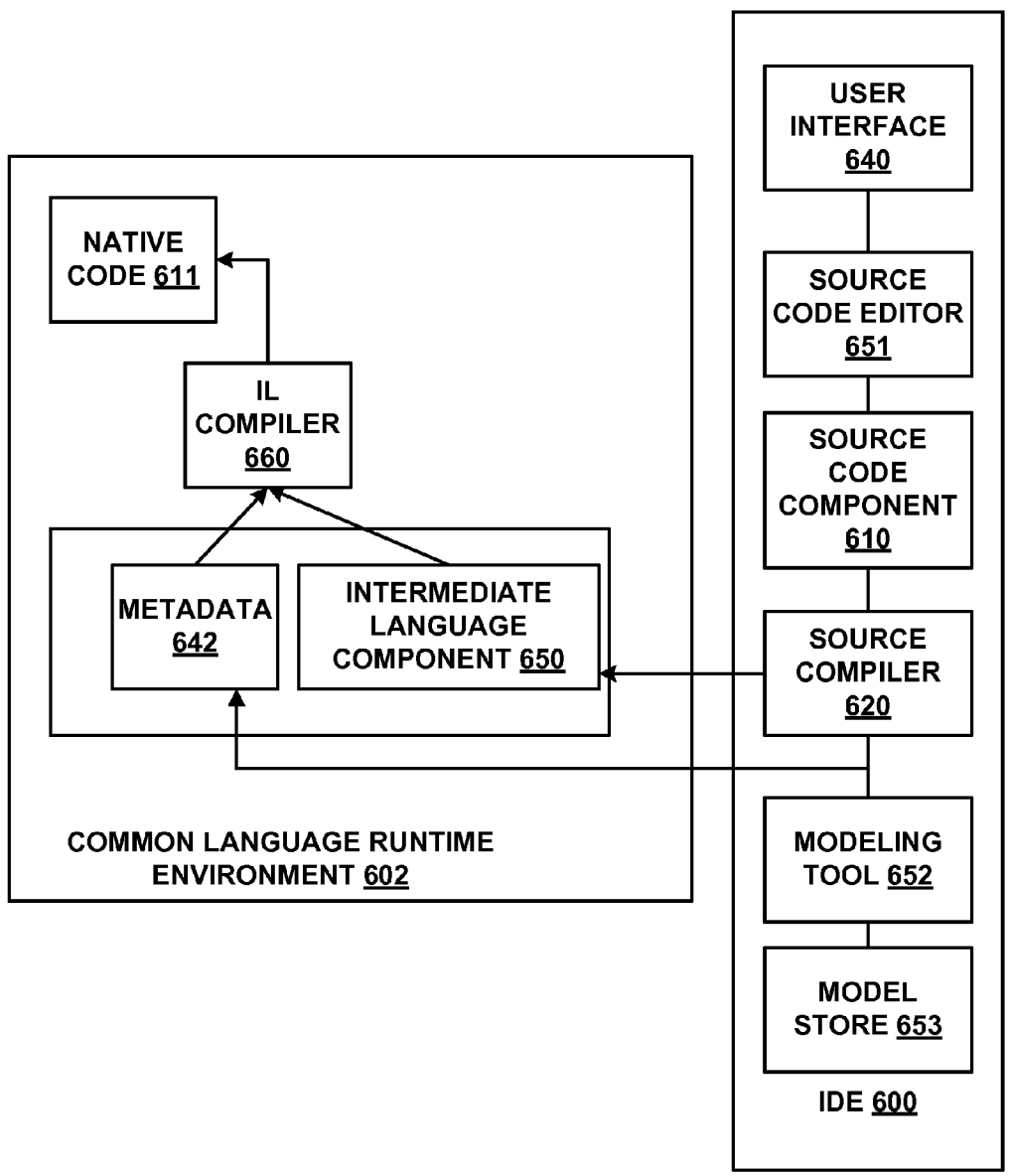
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft .NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a parse tree representing program source code by a processor of a software development computer, the program source code comprising at least one enclosing expression, the enclosing expression enclosing at least one enclosed expression;
   assigning a type associated with the enclosing expression to the at least one enclosed expression by:
      evaluating the at least one enclosing expression of the parse tree for applicability of contextual typing by:
         comparing the at least one enclosing expression of the parse tree with a set of templates;
         selecting a template from the set of templates, the selected template matching the at least one enclosing expression, the selected template associated with a process for assigning a type to the at least one enclosed expression; and
         assigning a type to the at least one enclosed expression by performing the process for assigning type to the at least one enclosed expression associated with the selected template in a top down direction; and
   providing type information for the at least one enclosed expression whose type is inferred from the type of an expression that encloses the enclosed expression on a display device.

2. The method of claim 1, further comprising:
   augmenting type inference proceeding from a leaf node of the parse tree in a bottom up direction of the parse tree, with contextual typing comprising type inference that proceeds in a top down direction of the parse tree.

3. The method of claim 1, further comprising:
   applying contextual typing to the at least one enclosed expression of the at least one enclosing expression of the parse tree, the enclosing expression comprising an assignment expression, the assignment expression comprising a left hand expression and a right hand expression, the left hand expression associated with a type; and
   applying contextual typing by assigning the type associated with the left hand expression to the right hand expression.

4. The method of claim 1, further comprising:
   applying contextual typing to the at least one enclosed expression of the at least one enclosing expression, the at least one enclosing expression comprising a typed function call, by assigning a type of a parameter of the typed function call to an argument expression of the typed function call.

5. The method of claim 1, further comprising:
   apply contextual typing to the at least one enclosed expression of the at least one enclosing expression of the parse tree, the at least one enclosed expression comprising a return statement and the at least one enclosing expression comprising a function of a known return type, by assigning a type of the function to the return statement.

6. The method of claim 1, further comprising;
   apply contextual typing to the at least one enclosed expression of the at least one enclosing expression of the parse tree, the at least one enclosing expression comprising an assignment or call expression, the assignment or call expression comprising multiple levels of nesting of object literals, function literals or array literals;
   applying contextual typing by applying a type associated with a property of the object literal, function literal or array literal, to the object literal, function literal or array literal.

7. A system comprising:
   at least one processor:
   a memory connected to the at least one processor: and
   a module that when loaded into the at least one processor causes the at least one processor to:
   perform contextual typing by:
      receiving program source code comprising an enclosing expression, the enclosing expression enclosing at least one enclosed expression; and
      assigning a data type of the enclosing expression to the at least one enclosed expression in a top down direction; and
   display the data type of the enclosed expression.

8. The system of claim 7, further comprising:
   a module that when loaded into the at least one processor causes the at least one processor to:
   receive a parse tree representing the program source code;
   evaluate an expression of a plurality of expressions of the parse tree for applicability of contextual typing by comparing the expression of the plurality of expressions of the parse tree with a set of templates, selecting a template from the set of templates, the selected template matching the evaluated expression, the selected template associated with a process for assigning a data type to the expression; and
   assign a data type to the evaluated expression by performing the process for assigning the data type to the expression matching the selected template.

9. The system of claim 7, further comprising:
   a module that when loaded into the at least one processor causes the at least one processor to:
   augment type inference proceeding from a leaf node of a parse tree representing the program source code in a bottom up direction of the parse tree, with contextual typing, contextual typing comprising type inference that proceeds in a top down direction of the parse tree.

10. The system of claim 7, further comprising:
a module that when loaded into the at least one processor causes the at least one processor to:
apply contextual typing to the at least one enclosed expression of the enclosing expression, the enclosing expression comprising an assignment expression, the assignment expression comprising a left hand expression and a right hand expression, the left hand expression associated with a data type,
applying the contextual typing by assigning the data type associated with the left hand expression to the right hand expression.

11. The system of claim 7, further comprising:
a module that when loaded into the at least one processor causes the at least one processor to:
apply contextual typing to the at least one enclosed expression of the enclosing expression comprising a typed function call, by assigning a data type of a parameter of the typed function call to an argument expression of the typed function call.

12. The system of claim 7, further comprising:
a module that when loaded into the at least one processor causes the at least one processor to:
apply contextual typing to the at least one enclosed expression of the enclosing expression, the at least one enclosed expression comprising a return statement and the enclosing expression comprising a function of a known return type, by assigning a return type of the function to the return statement.

13. The system of claim 7, further comprising:
a module that when loaded into the at least one processor causes the at least one processor to:
apply contextual typing to an enclosed expression of an enclosing expression, the enclosing expression comprising an assignment or call expression, the assignment or call expression comprising an object literal, function literal or array literal;
applying the contextual typing by applying a data type associated with a property of the object literal, function literal or array literal, to the object literal, function literal or array literal.

14. A device, comprising:
at least one processor and a memory; the at least one processor configured to:
perform contextual typing by:
receiving a parse tree representing a syntax structure of a program source code, the program source code comprising at least one enclosing expression, the at least one enclosing expression enclosing at least one enclosed expression; and
assigning a type of the enclosing expression to the at least one enclosed expression of the parse tree in a top down direction of the parse tree.

15. The device of claim 14, wherein the at least one processor is further configured to:
evaluate each of a plurality of expressions of the parse tree for applicability of contextual typing by comparing an expression of the plurality of expressions of the parse tree with a set of templates, selecting a template from the set of templates, the selected template matching the evaluated expression, the selected template associated with a process for assigning a data type to the at least one enclosed expression of the expression; and
perform the process associated with the selected template to assign a type to the at least one enclosed expression.

16. The device of claim 14, wherein the at least one processor is further configured to:
assign a type to the at least one enclosed expression by assigning a type associated with a left hand expression of an assignment expression to a right hand expression of the assignment expression.

17. The device of claim 14, wherein the at least one processor is further configured to:
assign a type of an argument expression of a typed function call by assigning a type of a parameter of the typed function call to an argument expression of the typed function call.

18. The device of claim 14, wherein the at least one processor is further configured to:
perform contextual typing by assigning a type associated with a parameter of a function to a function literal of the function.

19. The device of claim 14, wherein the at least one processor is further configured to:
perform contextual typing by assigning a type associated with a return argument of a function to a function literal of the function.

20. The device of claim 14, wherein the at least one processor is further configured to:
override contextual typing by explicit typing of the at least one enclosed expression.

* * * * *